Feb. 15, 1927.
N. SULZBERGER
1,617,425
APPARATUS AND METHOD FOR PRODUCING NOVEL LIGHTING EFFECTS
Filed Aug. 9, 1922
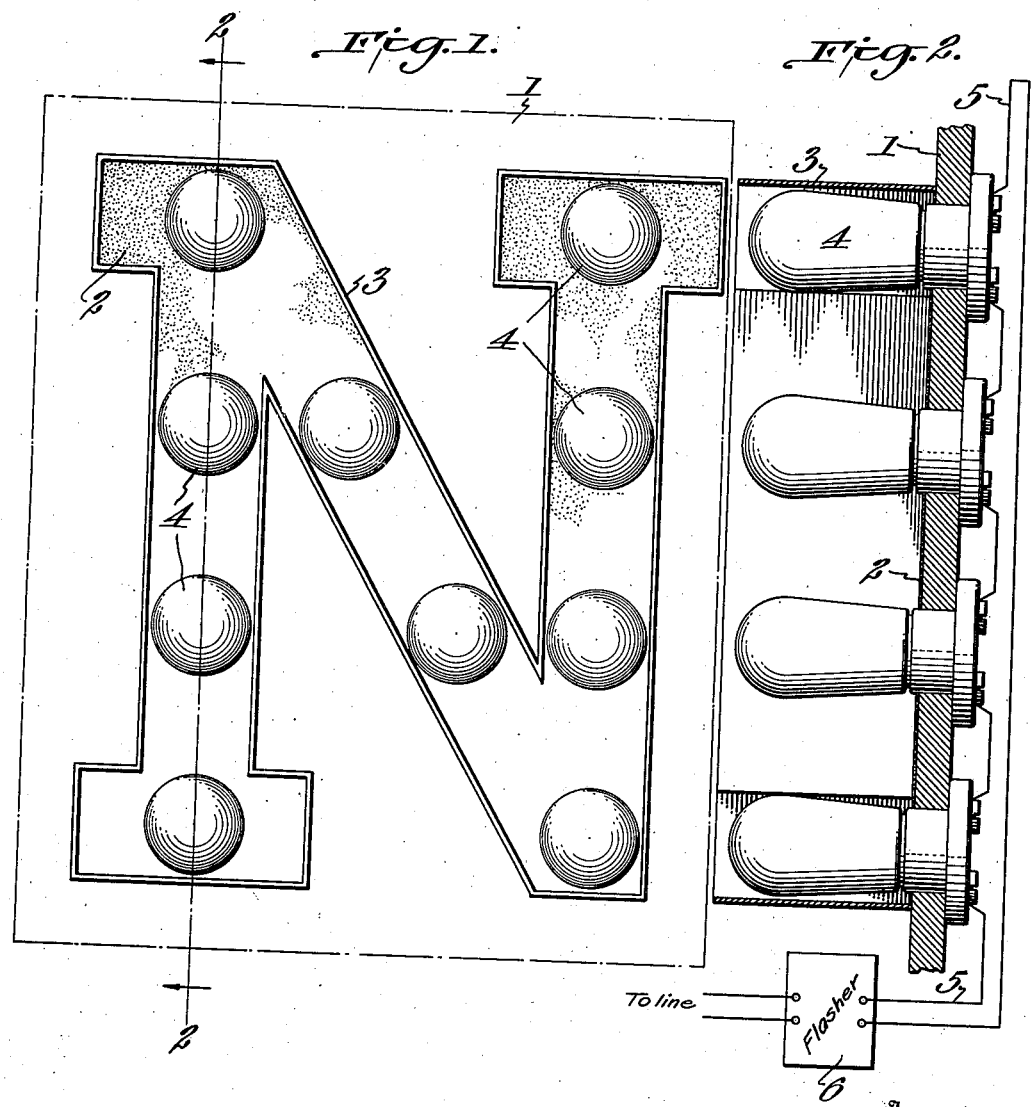

Patented Feb. 15, 1927.

1,617,425

UNITED STATES PATENT OFFICE.

NATHAN SULZBERGER, OF NEW YORK, N. Y.

APPARATUS AND METHOD FOR PRODUCING NOVEL LIGHTING EFFECTS.

Application filed August 9, 1922. Serial No. 580,688.

It is well-known, that luminescent material, both phosphorescent and fluorescent substances (like zinc sulphide, etc., fluorescein, anthracene, uranine, rhodamine etc.,) are readily aroused to activity by light rich in ultraviolet and poor in red and yellow rays. Heat also to a certain extent increases their luminescence. An ideal source of such light is for example, a so-called Kromayr (mercury-quartz) lamp with a screen of Wood or Corning glass, which will cut out all or a great part of the visible spectrum.

The object of my invention is to provide a method for producing novel lighting effects and also comprises the apparatus for doing the same. I have found a new and useful way of making use of the above properties of luminescent material by having such material aroused by a permanent or intermittent lighting arrangement in more or less close proximity to such material, such material, for example, being used as a paint or coating of parts and surfaces of the lighting equipment not too distant from the light-source and exposed to its rays. As an example of my invention I, herewith, describe letters and a method of their preparation, as such are used in connection with advertising, without, however, limiting myself to the specific elements of this description:—

The inside groove of a letter used for advertising purposes, which groove takes up the several electric light bulbs, is coated with a suitable adhesive material containing zinc sulphide of a phosphorescent nature. As such adhesive, sodium silicate may be used. The bulbs themeselves were left free from any coating. When the bulbs are lit, the letter will look much like the ordinary letter. When the current, however, is turned off, there will still remain visibility of the letter due to the phosphorescence of the coating. Thus, the letter will be visible—and possibly in another color— even after the current is off and, under certain conditions, the letter will shine in its entirety, while (when the bulbs were on) the letter had a "dotted" appearance, due to the unlit space between the bulbs. Thus, there is a great saving in electricity and also in the equipment (wiring, bulbs, labor, etc.), as the letters will shine without current for longer or shorter periods of time and different colors may, by suitable arrangement, be obtained with one and the same set of bulbs. The color depends, as well as the brightness and length of visibility on the nature and quality of the luminescent material used. Additions of substances and mixtures may be advantageously used to enhance the effect. Radio-active substances may be used. Also light rich in ultraviolet will increase the luminosity. In certain cases, the coating may contain (either alone or in mixture) substances of a fluorescent nature, as rhodamine, uranine etc., which will be visible only as long as the current is on, but may, in cases, require less current with greater luminosity, particularly, if the source of light is rich in effective rays.

One adaptation of the present invention is shown in the accompanying drawing in which Figure 1 is a front elevation of a sign letter according to my invention. Fig. 2 is a cross-sectional view on line 2—2 of Fig. 1.

On a background 1 any design may be outlined with luminescent material as the letter N is here shown at 2. If desired to more clearly show the boundaries of the luminescent surface sides may be built up as at 3 although the sides are not necessary to produce the desired effect. Light bulbs 4 are superimposed upon the luminescent surface and outline this surface. Electric current is supplied through the wires 5 and by means of the flasher 6 the current is caused to pass through the bulbs intermittently. While the current is flowing the bulbs produce a dotted light effect and when the current is shut off the background luminesces producing a solid light appearance as contrasted with the dotted light appearance described above. This produces a novel and striking effect. Certain desired effects (for stage, advertising, etc.) may also be obtained by employing a source of light, practically invisible to the eye and arousing phosphorescent or fluorescent material (or substances—paper, fabrics, etc.—treated with luminescent substances) to visible luminosity, as when using for sources of light, a light containing ultraviolet rays with certain light filters (Wood, Corning glass screens), which more or less eliminate the visible part of spectrum. Pictures, signs, stage effects (on material of all kinds, ropes, glass, fabrics, walls etc.), prepared with luminescent substances may be visibly shown by the use of more or less invisible light (for example a mercury-quartz lamp with Corning or Wood filter). Such surfaces etc. may be partly covered with phosphorescent and partly with fluorescent material, so that parts of the same will be visible only as long as the invisible light is on, and other portions (treated with the phosphorescent substances) remaining visible even after the invisible light is turned off. Condenser and other lenses may be used to increase luminosity etc. Effects may be obtained by using red and yellow light on such surfaces, which destroys the phosphorescence. In cases, the phosphorescence may be aroused by the use of so-called Geissler tubes, and lamps may be constructed with this principle. Reflectors and surfaces near the lamps of flashlights, pocket-lamps are particularly suited for the coatings.

Since I have an application, Serial Number 560,500½ filed May 12, 1922, pending in the office, at present, dealing, among other matter, particularly also with the coating and frosting of the globes and bulbs themselves with luminescent material, the specific reference to this feature is not made in the following claims.

As adhesives for fastening the luminescent substances to the desired places and objects, various materials may be used, as for example, sodium silicate (especially for glass surfaces), glue, gum arabic. A very excellent adhesive, particularly adapted for fastening phosphorescent zinc sulphide to paper, is a solution of chicle gum in benzol. I prefer to coat the paper, etc., with the solution of suitable percentage of chicle, allow the benzol to evaporate and dust on the zinc sulphide, rubbing off, after dry, any excess. Such paper remains pliable and well retains the luminescent properties.

The term "luminescent" used in the specification and the following claims designates phosphorescent as well as fluorescent material, either or both, as the case may be; including also mixtures by themselves or/and with other suitable substances.

I claim—

1. Surfaces partly covered with phosphorescent and partly with fluorescent material and a source of light for activating said surfaces, whereby both the phosphorescent and fluorescent surfaces are luminescent when so activated, and whereby the phosphorescent surface remains luminous after the activation ceases.

2. Surfaces partly covered with phosphorescent and partly with fluorescent material and a source of light for activating said surfaces in series with means for intermittently lighting the light, whereby both the phosphorescent and fluorescent surfaces are luminescent when so activated, and whereby the phosphorescent surface remains luminous after the activation ceases.

3. An advertising device comprising a background in part fluorescent and in part phosphorescent, together with a light and means for intermittently lighting it.

NATHAN SULZBERGER.